(12) United States Patent
Endo

(10) Patent No.: US 12,071,010 B2
(45) Date of Patent: Aug. 27, 2024

(54) ONBOARD DISPLAY DEVICE, ONBOARD DISPLAY METHOD, AND COMPUTER READABLE STORAGE MEDIUM

(71) Applicant: TOYOTA JIDOSHA KABUSHIKI KAISHA, Toyota (JP)

(72) Inventor: Hiroki Endo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 381 days.

(21) Appl. No.: 17/398,042

(22) Filed: Aug. 10, 2021

(65) Prior Publication Data

US 2022/0063406 A1     Mar. 3, 2022

(30) Foreign Application Priority Data

Aug. 31, 2020  (JP) ................. 2020-146333

(51) Int. Cl.
*B60K 35/00* (2024.01)
*B60K 35/23* (2024.01)
*B60K 35/28* (2024.01)
*B60K 35/29* (2024.01)

(52) U.S. Cl.
CPC .............. *B60K 35/00* (2013.01); *B60K 35/23* (2024.01); *B60K 35/28* (2024.01); *B60K 35/29* (2024.01); *B60K 2360/176* (2024.01); *B60K 2360/182* (2024.01); *B60K 2360/1868* (2024.01); *B60K 2360/195* (2024.01)

(58) Field of Classification Search
CPC ............ B60K 35/00; B60K 2370/1529; B60K 2370/195; B60K 2370/182; B60K 2370/176; B60K 2370/193

USPC ........................................................ 701/36
See application file for complete search history.

(56) References Cited

U.S. PATENT DOCUMENTS 11,790,613 B2 * 10/2023 Lee .................. G02B 27/0093
                                                          345/633
2020/0079379 A1 *  3/2020 Mimura ................ B60W 10/04
2020/0219398 A1 *  7/2020 Shimizu ................ B60K 35/22
2022/0203834 A1 *  6/2022 Nakao .................... G06F 3/1423
2022/0212689 A1 *  7/2022 Nakao .................... G08G 1/0962

FOREIGN PATENT DOCUMENTS

JP       2020-042612 A      3/2020
WO       2019/038903 A1     2/2019

* cited by examiner

*Primary Examiner* — Yazan A Soofi
(74) *Attorney, Agent, or Firm* — Oliff PLC

(57) ABSTRACT

A MET and a HUD are provided inside a cabin of an host vehicle so as to be capable of being viewed by an occupant. An acquisition section is configured to acquire information regarding surrounding objects around the host vehicle. A control section is configured to suppress display on the HUD of an image of a surrounding object other than a first preceding vehicle traveling ahead in a current traveling lane of the host vehicle from out of images of surrounding objects for which the information has been acquired by the acquisition section. The control section also displays the first preceding vehicle and other surrounding objects on the MET, with display of the other surrounding objects being incrementally toned-down according to their importance level.

18 Claims, 12 Drawing Sheets

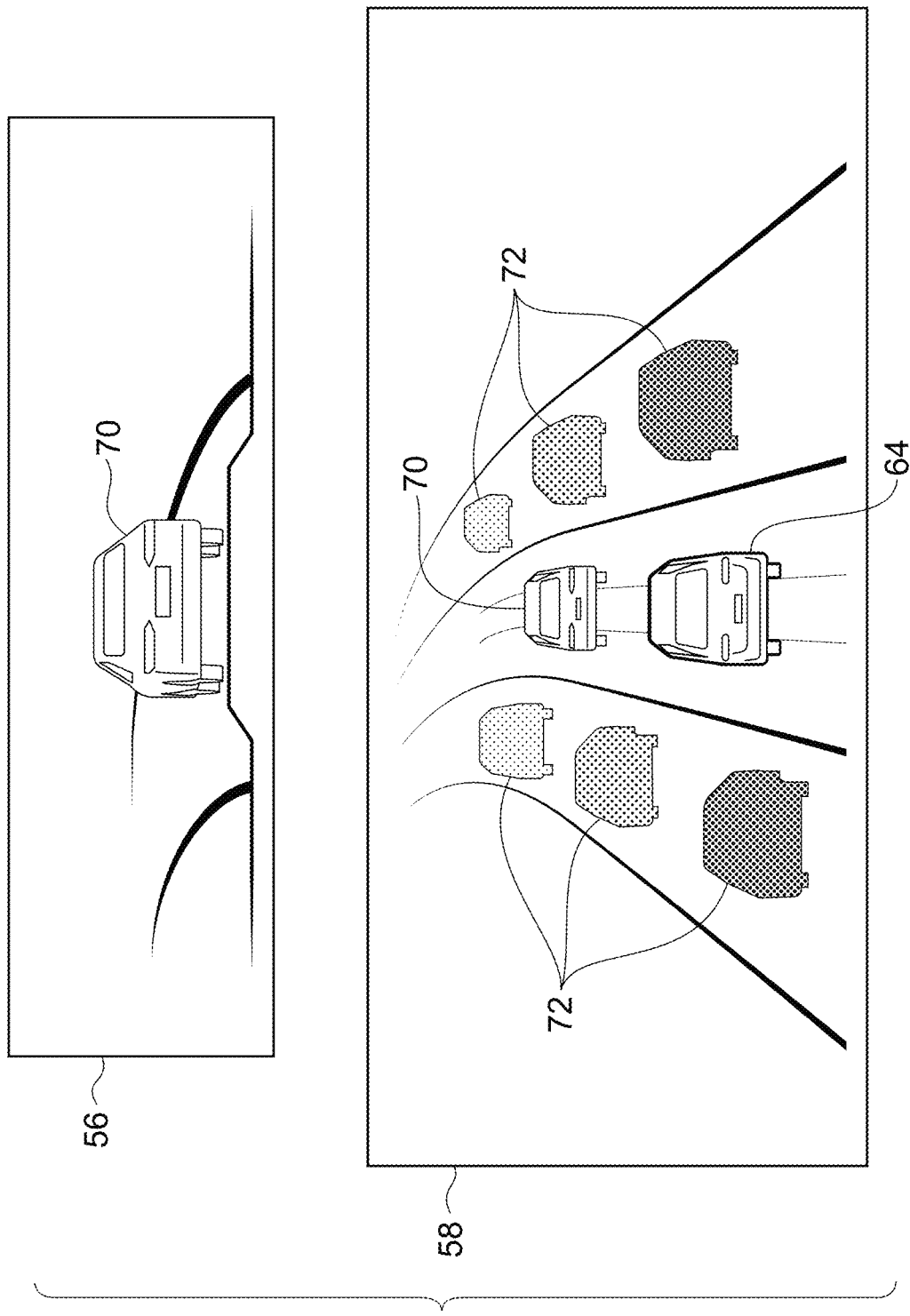

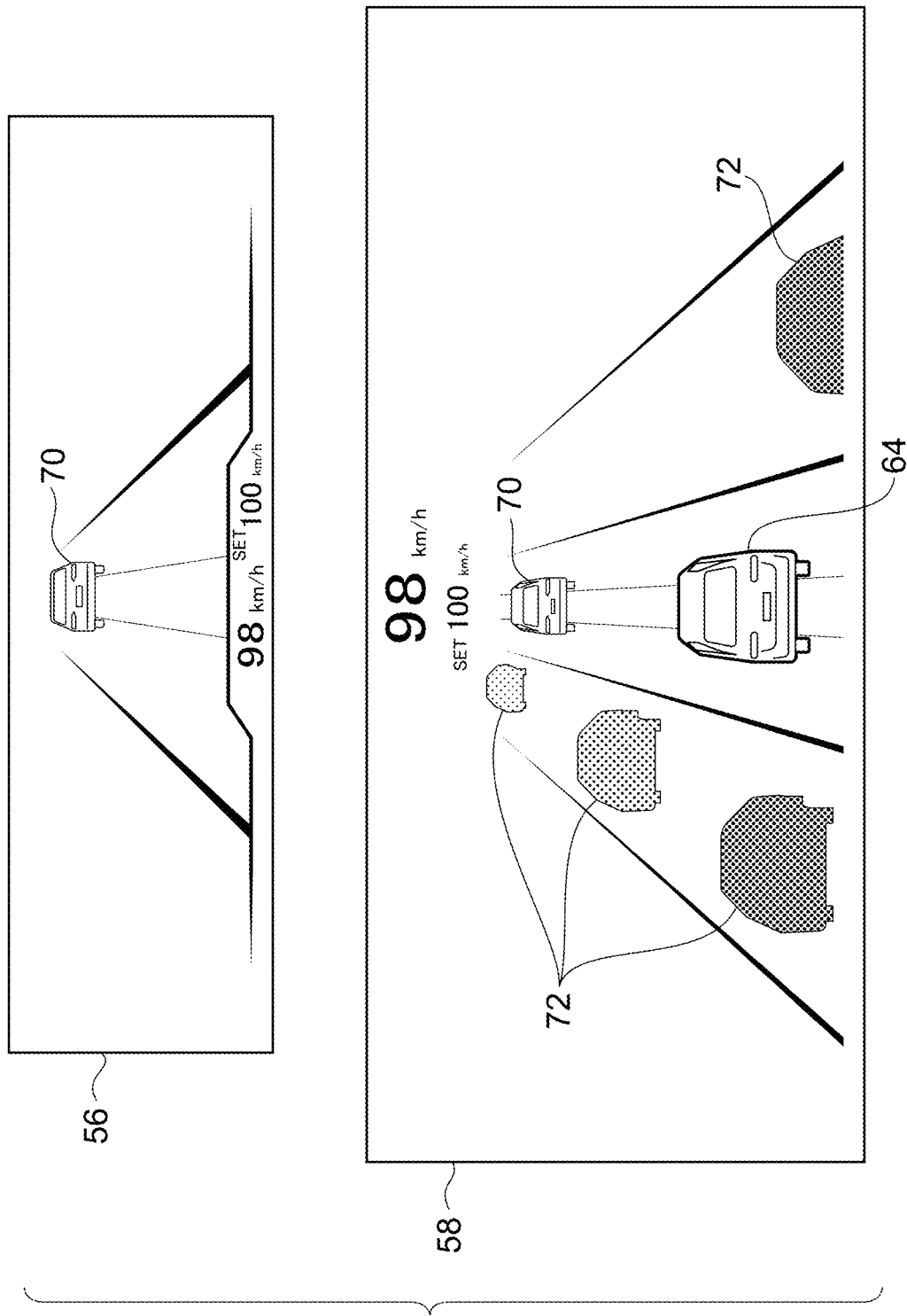

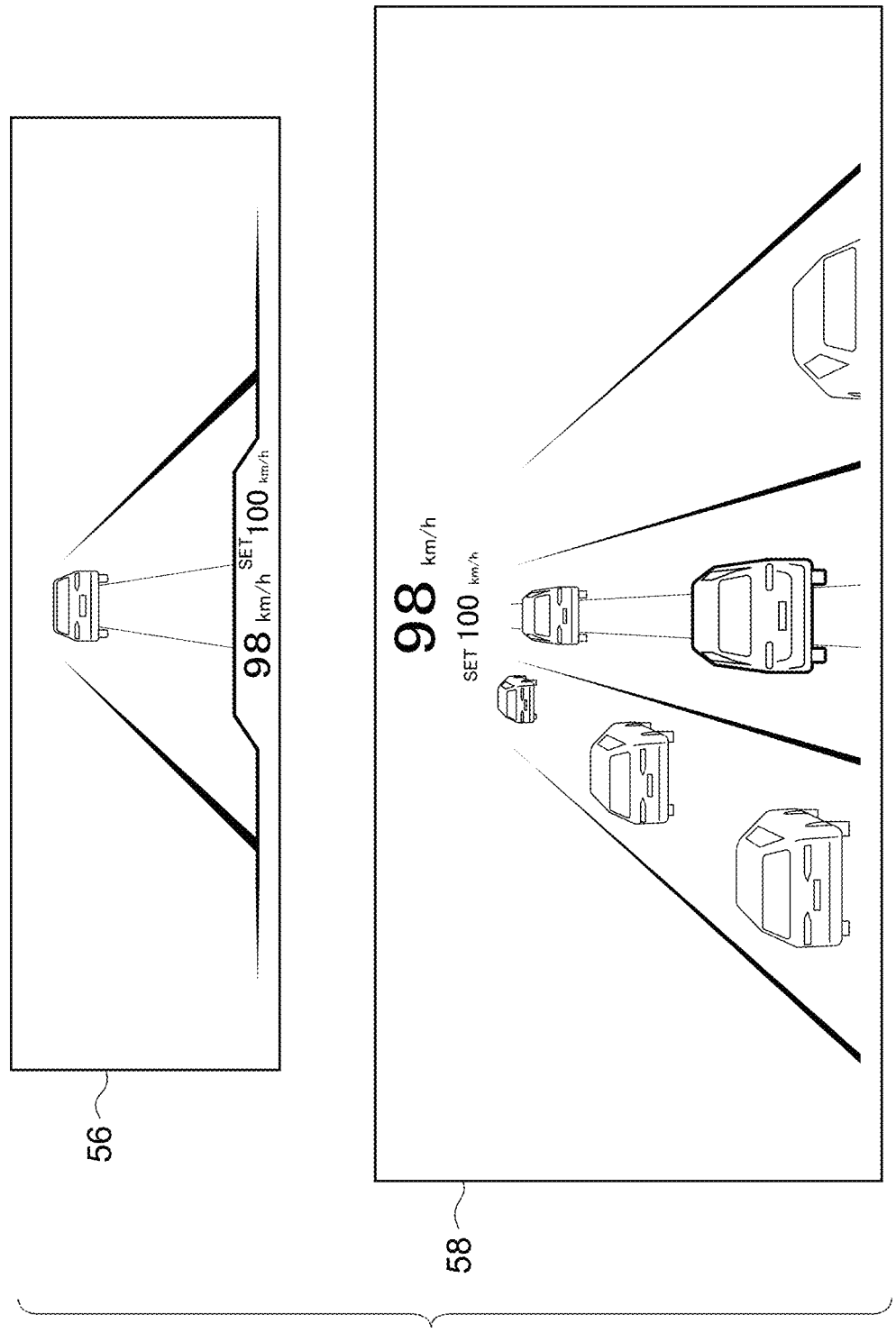

ONBOARD DISPLAY DEVICE, ONBOARD DISPLAY METHOD, AND COMPUTER READABLE STORAGE MEDIUM

CROSS-REFERENCE TO RELATED APPLICATION

This application is based on and claims priority under 35 USC 119 from Japanese Patent Application No. 2020-146333 filed on Aug. 31, 2020, the disclosure of which is incorporated by reference herein.

TECHNICAL FIELD

The present disclosure relates to an onboard display device, an onboard display method, and a computer readable storage medium.

RELATED ART

Japanese Patent Application Laid-Open (JP-A) No. 2020-042612 (Patent Document 1) discloses technology in which images representing other vehicles recognized as objects are displayed on a display so as to be superimposed on an image representing a road on which an host vehicle is present. Emphatic display is performed for images representing vehicles or the like that influence the behavior of the host vehicle.

In the technology of Patent Document 1, all vehicles around the host vehicle are displayed on the display section. Accordingly, in cases in which in which a display region of the display section has a limited surface area, particularly in the case of a head-up display (HUD), this display may appear annoyingly cluttered to an occupant when multiple vehicles are present in the surroundings.

SUMMARY

In consideration of the above circumstances, an object of the present disclosure is to obtain an onboard display device, an onboard display method, and a computer readable storage medium capable of suppressing a display from appearing annoyingly cluttered to an occupant.

An onboard display device according to a first aspect includes a first display provided inside a cabin of a host vehicle, a second display provided inside the cabin of the host vehicle, an acquisition section configured to acquire information regarding surrounding objects around the host vehicle, and a control section configured to suppress to display on the second display an image of a surrounding object other than a first preceding vehicle traveling ahead in a current traveling lane of the host vehicle from out of the surrounding objects.

In the first aspect, from out of the images of surrounding objects around the host vehicle, display on the second display of an image of a surrounding object other than a first preceding vehicle traveling ahead in the current traveling lane of the host vehicle is suppressed. Thus, even in cases in which the display region of the second display has a limited surface area as in the case of a HUD, and there are multiple surrounding objects around the host vehicle, the display on the second display can be suppressed from appearing annoyingly cluttered to the occupant.

A second aspect is the first aspect, wherein in cases in which an event is underway during driving of the host vehicle, the control section is configured to display on the second display an image of a surrounding object other than the first preceding vehicle, as set in response to the event.

In the second aspect, displaying an image of a surrounding object other than the first preceding vehicle in response to the event underway during driving of the host vehicle enables the occupant viewing the display on the second display to be prompted to pay attention.

A third aspect is the second aspect, wherein in cases in which the event underway during driving of the host vehicle is an event in which a second preceding vehicle traveling ahead in a lane other than the current traveling lane of the host vehicle is changing lanes into the current traveling lane of the host vehicle, the control section is configured to emphatically display the second preceding vehicle on the second display.

In the third aspect, in cases in which the second preceding vehicle is changing lanes into the current traveling lane of the host vehicle, i.e. cutting in, the occupant can easily be made aware that the second preceding vehicle is cutting in.

A fourth aspect is the second aspect or the third aspect, wherein in cases in which the event underway during driving of the host vehicle is an event in which the host vehicle is changing lanes from the current traveling lane of the host vehicle to a lane other than the current traveling lane, the control section is configured to display on the second display both the first preceding vehicle traveling ahead in the current traveling lane and a second preceding vehicle traveling ahead in the lane other than the current traveling lane.

In the fourth aspect, in cases in which the host vehicle is changing lanes from the current traveling lane of the host vehicle to a lane other than the current traveling lane, the occupant can easily be made aware of the presence of the first preceding vehicle and the second preceding vehicle that are relevant to the lane change.

A fifth aspect is any one of the first aspect to the fourth aspect, wherein the control section is configured to display on the first display an image of a surrounding object for which the information has been acquired by the acquisition section.

In the fifth aspect, using different display formats for the first display and the second display enables a display region of the first display to be effectively utilized in cases in which the display region of the first display has a comparatively large surface area, as in the case of a meter display.

A sixth aspect is the fifth aspect, wherein the control section is configured to display on the first display an image of a surrounding object other than the first preceding vehicle traveling ahead in the current traveling lane of the host vehicle such that the target surroundings object image is displayed less prominently than an image of the first preceding vehicle.

In the sixth aspect, the display on the first display can be suppressed from appearing annoyingly cluttered to the occupant, even in cases in which multiple surrounding objects are around the host vehicle.

A seventh aspect is the sixth aspect, wherein the control section is configured to display the image of the surrounding object other than the first preceding vehicle less prominently than the image of the first preceding vehicle by toning down display of the image of the surrounding object other than the first preceding vehicle.

In the seventh aspect, creating a distinction between display of the first preceding vehicle image and other surrounding object image in this manner enables the occupant to be made aware of the respective degrees of influence on the host vehicle during driving of the host vehicle.

An eighth aspect is any one of the first aspect to the seventh aspect, wherein the first display is a meter display of the host vehicle, and the second display is a head-up display of the host vehicle.

In the eighth aspect, the occupant of the host vehicle is able to see the display in which images of surrounding objects other than the first preceding vehicle are suppressed on the second display (HUD) when looking out ahead of the vehicle. This enables the occupant to quickly perceive information relating the surrounding objects, while reducing annoying clutter.

A ninth aspect is any one of the first aspect to the eighth aspect, wherein the first display is configured with a larger display region than the second display, and the second display is configured as a display region below an exterior scene ahead as viewed from the perspective of an occupant of the host vehicle looking ahead from the host vehicle.

In the ninth aspect, the occupant is able to perceive information regarding surrounding objects in a manner that effectively utilizes the sizes of the respective display regions of the first display and the second display.

In an onboard display method according to a tenth aspect, a computer executes processing, the processing including acquiring information regarding surrounding objects around a host vehicle, and out of a first display provided inside a cabin of the host vehicle and a second display provided inside the cabin of the host vehicle, suppressing to display on the second display an image of a surrounding object other than a first preceding vehicle traveling ahead in a current traveling lane of the host vehicle from out of the surrounding objects.

In the tenth aspect, the display on the second display can be suppressed from appearing annoyingly cluttered to the occupant.

A computer readable storage medium according to an eleventh aspect holds an onboard display program that causes a computer to execute processing, the processing including acquiring information regarding surrounding objects around a host vehicle, and out of a first display provided inside a cabin of the host vehicle and a second display provided inside the cabin of the host vehicle, suppressing to display on the second display an image of a surrounding object other than a first preceding vehicle traveling ahead in a current traveling lane of the host vehicle from out of the surrounding objects.

In the eleventh aspect, the display on the second display can be suppressed from appearing annoyingly cluttered to the occupant.

The present disclosure exhibits the advantageous effect of being capable of suppressing display from appearing annoyingly cluttered to an occupant.

BRIEF DESCRIPTION OF DRAWINGS

FIG. 6 is an image illustrating an example of display on a HUD and a MET according to an exemplary embodiment;

FIG. 7 is an image illustrating an example of display on a HUD and a MET according to an exemplary embodiment;

FIG. 11 is an image illustrating an example of display on a HUD and a MET according to a comparative example.

DETAILED DESCRIPTION

Figure 1:
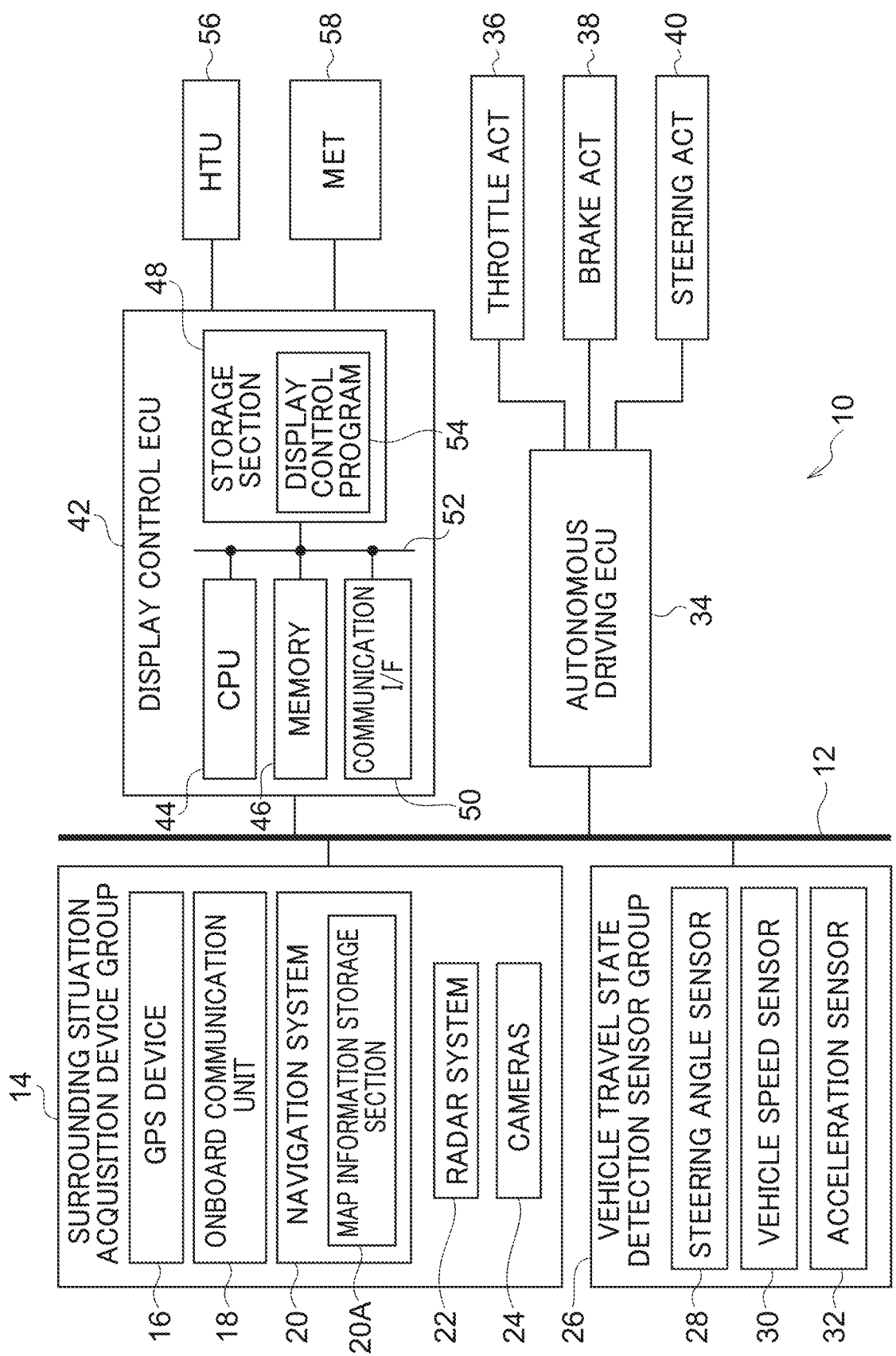
FIG. 1 is a block diagram illustrating a schematic configuration of an onboard system according to an exemplary embodiment.

Detailed explanation follows regarding an example of an exemplary embodiment of the present disclosure, with reference to the drawings. As illustrated in FIG. 1, an onboard system 10 includes a communication bus 12. A surrounding situation acquisition device group 14, a vehicle travel state detection sensor group 26, an autonomous driving electronic control unit (ECU) 34, and a display control ECU 42 are respectively connected to the communication bus 12. Note that the onboard system 10 is only partially illustrated in FIG. 1. A vehicle installed with the onboard system 10 is hereafter referred to as the host vehicle.

The surrounding situation acquisition device group 14 includes devices for acquiring information indicating the situation in the peripheral environment of the host vehicle, including a global positioning system (GPS) device 16, an onboard communication unit 18, a navigation system 20, a radar system 22, cameras 24, and the like.

The GPS device 16 receives GPS signals from plural GPS satellites in order to find the position of the host vehicle. The greater the number of GPS signals the GPS device 16 can receive, the better the positioning accuracy. The onboard communication unit 18 is a communication device that performs at least one out of vehicle-to-vehicle communication with other vehicles, or road-to-vehicle communication with roadside equipment. The navigation system 20 includes a map information storage section 20A that stores map information. The navigation system 20 performs processing to display the position of the host vehicle on a map, guide along a route to a destination, and so on based on position information obtained from the GPS device 16 and the map information stored in the map information storage section 20A.

The radar system 22 is configured of plural radar devices, each with a different detection range. The radar system 22 detect objects such as pedestrians and other vehicles around the host vehicle as point cloud data, and acquires relative positions and relative speeds of the detected objects with respect to the host vehicle. The radar system 22 includes an inbuilt processing device that processes search results regarding surrounding objects. The processing device employs changes in the relative position and relative speed of each object included in plural most recent search results in order to exclude noise and roadside objects such as guardrails from monitoring targets, and to track specific objects such as pedestrians and other vehicles serving as surrounding objects. The radar system 22 then outputs information such as the relative position and relative speed of each of the surrounding objects. The cameras 24 are configured of plural cameras that image the periphery of the host vehicle and output the captured images.

The vehicle travel state detection sensor group 26 includes plural sensors for acquiring a travel state of the vehicle, including a steering angle sensor 28 that detects the steering angle of the host vehicle, a vehicle speed sensor 30 that detects the travel speed of the host vehicle, and an acceleration sensor 32 that detects an acceleration rate of the host vehicle.

A throttle actuator (ACT) 36 that changes the throttle position of the host vehicle, and a brake ACT 38 that changes braking force generated by a braking device of the host vehicle are connected to the autonomous driving ECU 34. A steering ACT 40 that changes a steering amount of a steering device of the host vehicle is also connected to the autonomous driving ECU 34.

The autonomous driving ECU 34 includes a central processing unit (CPU), memory such as read only memory (ROM) and random access memory (RAM), a non-volatile storage section such as a hard disk drive (HDD) or a solid state drive (SSD), and a communication interface (I/F). Autonomous driving software is stored in the storage section. When an autonomous driving mode has been selected, the CPU executes the autonomous driving software such that the autonomous driving ECU 34 performs autonomous driving processing to cause the host vehicle to travel autonomously without requiring an occupant of the host vehicle to perform a driving operation. The autonomous driving processing is processing to determine the situation of the host vehicle and its surroundings based on information obtained from the surrounding situation acquisition device group 14 and the vehicle travel state detection sensor group 26, and to control the throttle ACT 36, the brake ACT 38, and the steering ACT 40 accordingly.

More specifically, the autonomous driving ECU 34 acquires information relating to surrounding objects around the host vehicle and the like from the surrounding situation acquisition device group 14 including the radar system 22. Based on the situation of the host vehicle and its surroundings as indicated by the acquired information, the autonomous driving ECU 34 then determines whether or not an event is underway during driving of the host vehicle. Examples of such events include lane merges, lane changes, passing through an intersection, and a preceding vehicle cutting in. The occurrence of such an event and an event type are output to the display control ECU 42 as peripheral situation information.

The autonomous driving ECU 34 also evaluates importance levels corresponding to the degree to which each surrounding object around the host vehicle affects autonomous driving, based on the relative position, relative speed, and so on of each of the surrounding objects as indicated by the information acquired from the radar system 22 and so on. For example, in cases in which an event is not underway and surrounding objects are around the host vehicle, the autonomous driving ECU 34 sets an importance level for each of the surrounding objects such that importance level of each surrounding object increases with decreasing distance between the host vehicle and the surrounding target decreases. In cases in which a first preceding vehicle traveling ahead in the current traveling lane of the host vehicle is around the host vehicle, the autonomous driving ECU 34 sets the first preceding vehicle to a maximum importance level.

As another example, in cases in which an event is underway in which a second preceding vehicle traveling ahead in a lane other than the current traveling lane of the host vehicle changes lanes into the current traveling lane of the host vehicle, the autonomous driving ECU 34 sets the importance level of the second preceding vehicle to a higher importance level than other surrounding objects. For other target objects, the importance level of each surrounding object is set so as to increase with decreasing distance between the host vehicle and the surrounding object.

As another example, in cases in which an event is underway in which the host vehicle changes lanes from a first lane to a second lane other than the first lane during travel of the host vehicle, the autonomous driving ECU 34 evaluates the importance levels of the first preceding vehicle traveling in the first lane and the second preceding vehicle traveling in the second lane as being higher than the importance levels of other surrounding objects. For other target objects, the importance level of each surrounding object is set so as to increase with decreasing distance between the host vehicle and the surrounding object. Information indicating the importance level of each of the surrounding objects is output together with information indicating the relative position, relative speed, and so on of each of the surrounding objects to the display control ECU 42 as surrounding object information.

Note that in the present exemplary embodiment, the level of autonomous driving performed by the autonomous driving ECU 34 is either level 2 or level 3. During autonomous driving at level 2 or level 3, the occupant is required to monitor the autonomous driving by the autonomous driving ECU 34 and to intervene if required in the event of driving falling outside of a controllable range, inappropriate operation due to misdetection, non-detection, or malfunction of sensors, or the like.

Figure 2:
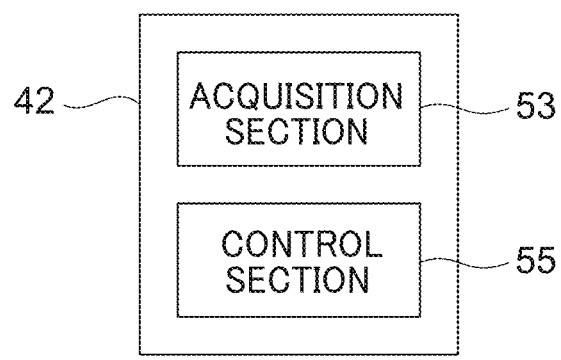
FIG. 2 is a functional block diagram of a display control ECU.

The display control ECU 42 includes a CPU 44, memory 46 such as ROM and RAM, a non-volatile storage section 48 such as a HDD or SSD, and a communication I/F 50. The CPU 44, the memory 46, the storage section 48, and the communication I/F 50 are connected together so as to be capable of communicating with each other through an internal bus 52. A display control program 54 is stored in the storage section 48. The display control ECU 42 reads the display control program 54 from the storage section 48 and expands the program in the memory 46, and the display control program 54 expanded in the memory 46 is executed by the CPU 44. Thus, as illustrated in FIG. 2, the display control ECU 42 functions as an acquisition section 53 and a control section 55 in order to perform display control processing, described later. Note that the display control program 54 is an example of an onboard display program.

Figure 3:
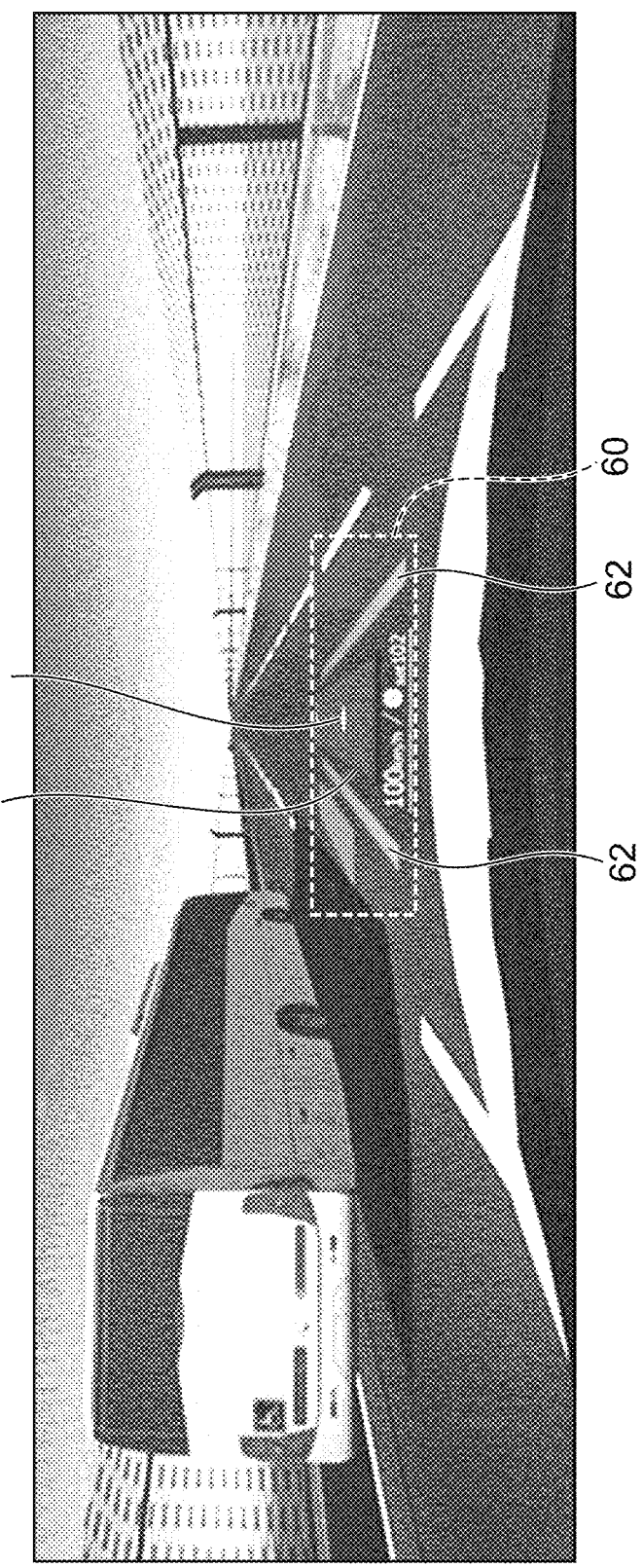
FIG. 3 is an image illustrating an example of a display range of a HUD.

A head-up display (hereafter referred to as HUD) 56 and a meter display (hereafter referred to as MET) 58 are connected to the display control ECU 42. As illustrated by the display range indicated by the reference numeral 60 in FIG. 3, the HUD 56 according to the present exemplary embodiment is a small HUD and is for example reflected on a windshield within a display range covering part of a forward field of view (an image toward the bottom of a scene ahead) of the occupant of the host vehicle. The MET 58 is a display provided to an instrument panel of the host vehicle. The display control ECU 42 controls information display on the HUD 56 and the MET 58. A display region of the MET 58 is preferably larger than a display region of the HUD 56.

More specifically, the acquisition section 53 acquires information regarding surrounding objects around the host vehicle. Out of images of surrounding objects for which information has been acquired by the acquisition section 53, the control section 55 suppresses display of images of surrounding objects other than the first preceding vehicle traveling ahead in the current traveling lane of the host vehicle on the HUD 56. Note that the MET 58 is an example of a first display, and the HUD 56 is an example of a second display.

Figure 4:
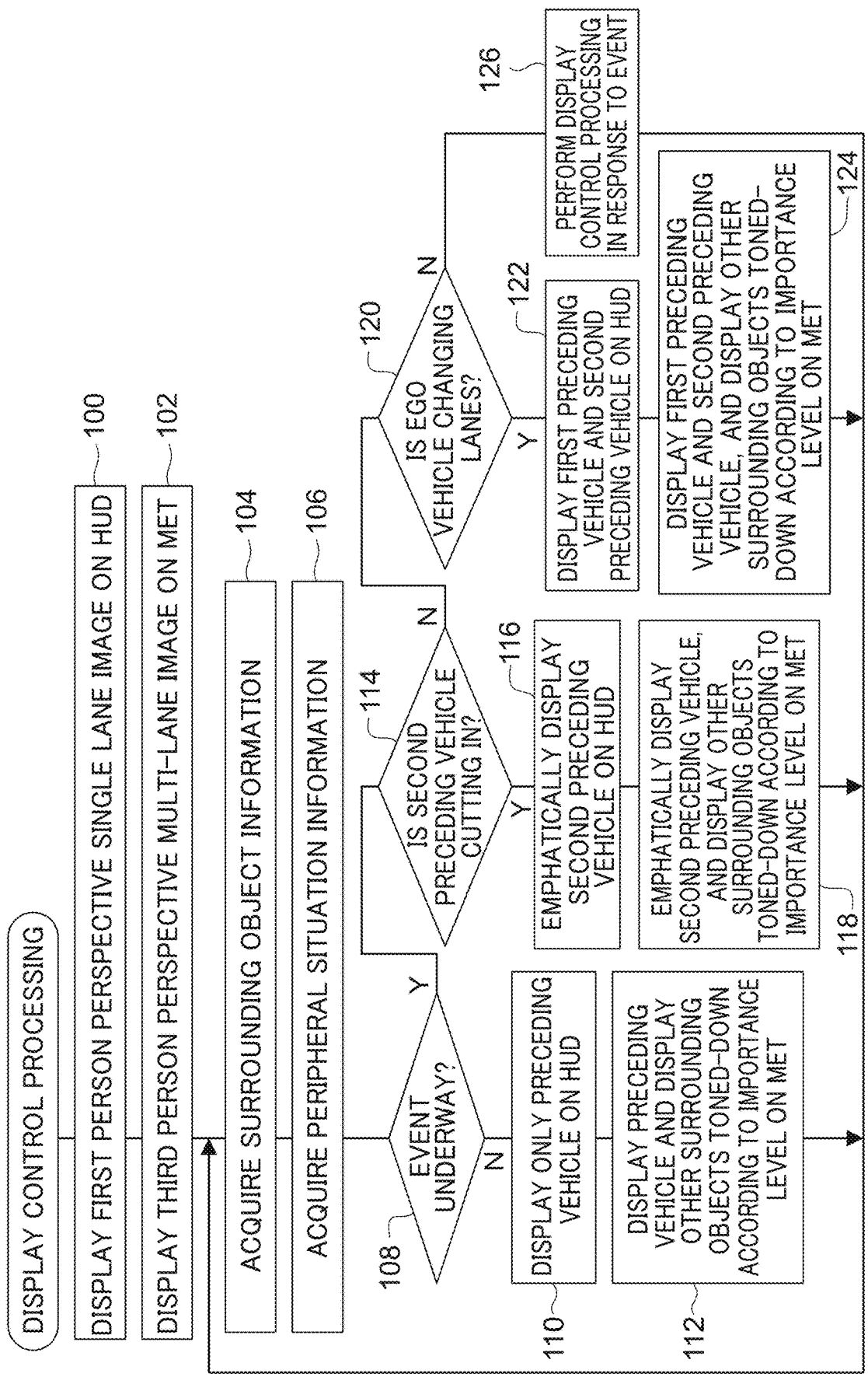
FIG. 4 is a flowchart illustrating display control processing.
Figure 5A:
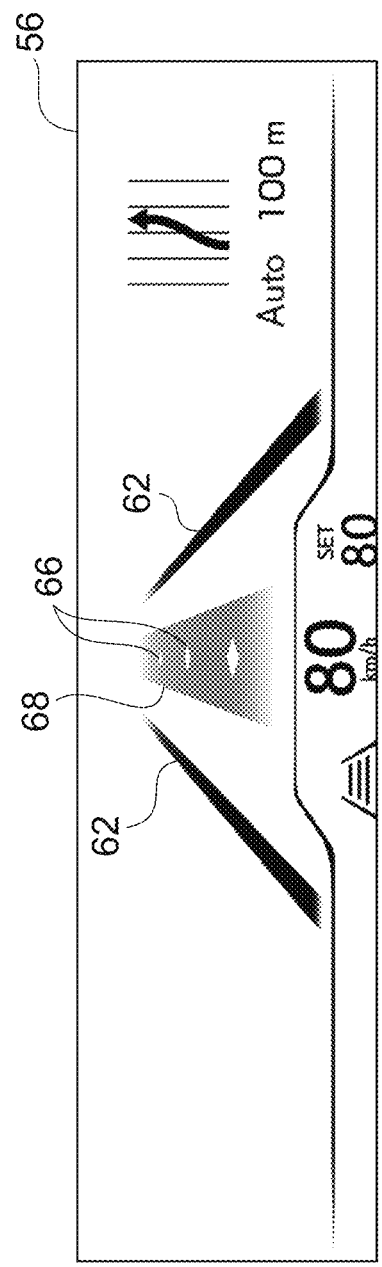
FIG. 5A is an image illustrating an example of a first person perspective single lane image displayed on a HUD.

Next, explanation follows regarding operation of the present exemplary embodiment. The display control ECU 42 performs the display control processing illustrated in FIG. 4 while an ignition switch of the host vehicle is on. At step 100 of the display control processing, the acquisition section 53 acquires from the autonomous driving ECU 34 information regarding lanes identified by the autonomous driving ECU 34. Note that this lane information includes information regarding an host vehicle lane along which the host vehicle is traveling (information regarding whether the lane is straight or curved, and so on), and information regarding neighboring lanes on the left and right of the host vehicle lane (including whether or not such neighboring lanes exist). Based on the lane information acquired by the acquisition section 53 from the autonomous driving ECU 34, the control section 55 generates a first person perspective single lane image such as that illustrated in the example of FIG. 5A as an image including road width lines 62 representing lane boundary lines, and displays the generated first person perspective single lane image on the HUD 56.

The first person perspective single lane image is an image that approximates a state from the perspective of the occupant when looking ahead through the windshield of the host vehicle, and neighboring lanes on the left and right of the host vehicle lane are not subject to display. The first person perspective single lane image is an image display in which the host vehicle lane appears disproportionately large, whereas information that is not important when monitoring travel is omitted from display so as to minimize annoying clutter.

Figure 5B:
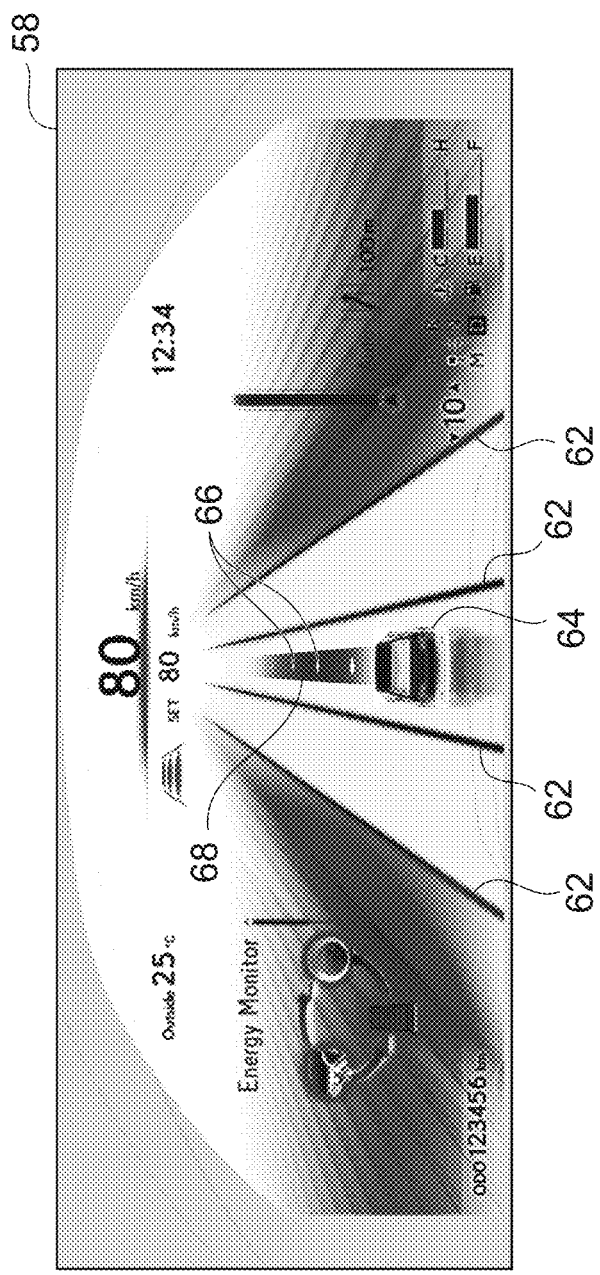
FIG. 5B is an image illustrating an example of a third person perspective multi-lane image displayed on a MET.

At the next step 102, based on the lane information acquired by the acquisition section 53 from the autonomous driving ECU 34, the control section 55 generates a third person perspective multi-lane image such as that illustrated in the example of FIG. 5B as an image including road width lines 62 representing lane boundary lines. The control section 55 then displays the generated third person perspective multi-lane image on the MET 58.

The third person perspective multi-lane image is a bird's-eye view as seen from an upper-rear side of the host vehicle, and neighboring lanes on the left and right of the host vehicle lane are also subject to display. When only lanes that actually exist are subject to display, under typical conditions no more than three lanes will be displayed. However, there is no limitation to displaying a maximum of three lanes in order to facilitate understanding in complex layouts in which lanes branch or merge. The host vehicle is displayed as an icon 64 in the third person perspective multi-lane image. In situations in which for example the host vehicle is about to change lanes when another vehicle approaches from the rear-right or rear-left, the lane change is delayed until the other vehicle has passed by, after which the lane change is performed. The third person perspective multi-lane image enables situations such as the approach of the other vehicle and the delay to the lane change to be displayed.

The road width lines 62 representing lane boundary lines are displayed in both the first person perspective single lane image and the third person perspective multi-lane image, thereby conveying to the occupant that the first person perspective single lane image and the third person perspective multi-lane image are schematic diagrams representing a scaled-down approximation of the actual scene. Moreover, respective markers 66 are displayed at positions corresponding to future positions of the host vehicle in both the first person perspective single lane image and the third person perspective multi-lane image, and as the host vehicle travels the array of markers 66 advances (moves downward in the respective displays) toward a reference position corresponding to the host vehicle. This enables the occupant to intuitively ascertain that the first person perspective single lane image and the third person perspective multi-lane image correspond to the actual scene ahead. Furthermore, a strip shaped trajectory line 68 within which the markers 66 are arrayed is displayed in both the first person perspective single lane image and the third person perspective multi-lane image. The direction along which the strip shaped trajectory line 68 extends in the first person perspective single lane image and the third person perspective multi-lane image indicates the direction of progress of the host vehicle, enabling the occupant to intuitively ascertain the position to which the host vehicle will progress.

Next, at step 104, the acquisition section 53 acquires from the autonomous driving ECU 34 surrounding object information indicating the relative position, relative speed, importance level, and so on of each of the surrounding objects. The surrounding object information is an example of information regarding surrounding objects. At step 106, the acquisition section 53 acquires from the autonomous driving ECU 34 peripheral situation information indicating whether or not an event is underway, the type of event underway, and so on. At step 108, the control section 55 determines whether or not an event is underway during driving of the host vehicle based on the peripheral situation information that the acquisition section 53 has acquired from the autonomous driving ECU 34.

In cases in which an event is not underway during driving of the host vehicle (in a normal state), negative determination is made at step 108 and processing transitions to step 110. At step 110, the control section 55 determines whether or not a first preceding vehicle traveling ahead in the current traveling lane of the host vehicle is around the host vehicle, based on the surrounding object information. In cases in which a first preceding vehicle traveling ahead in the current traveling lane of the host vehicle is around the host vehicle, the control section 55 superimposes display of only a first preceding vehicle 70 on the first person perspective single lane image displayed on the HUD 56, as illustrated in the examples of FIG. 6 and FIG. 7.

Figure 10:
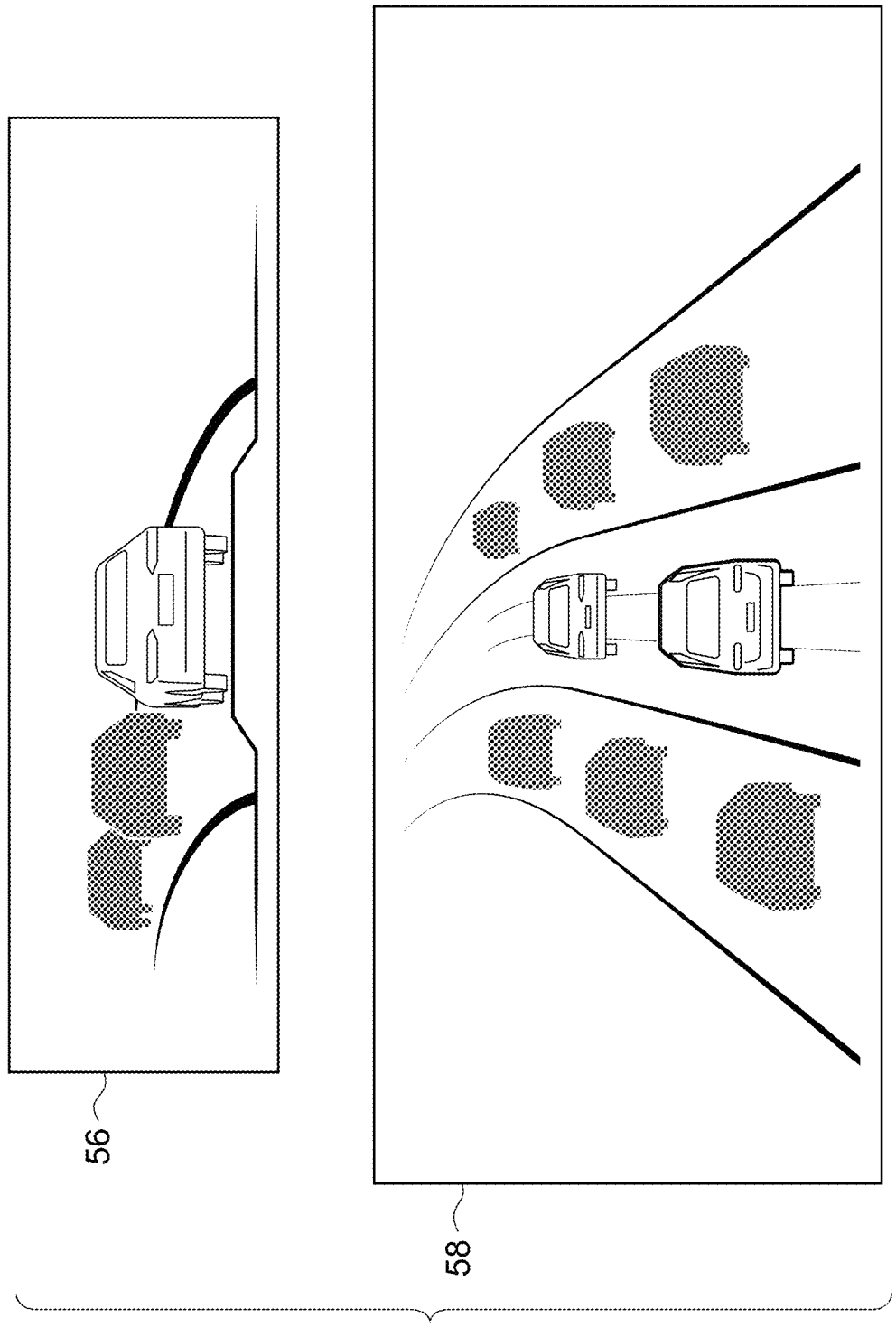
FIG. 10 is an image illustrating an example of display on a HUD and a MET according to a comparative example.

In situations in which surrounding objects other than a first preceding vehicle are also around the host vehicle, were all of these surrounding objects to be displayed on the HUD 56 as illustrated in the example of FIG. 10, then the display on the HUD 56 would appear annoyingly cluttered to the occupant. In contrast thereto, as illustrated in FIG. 6 and FIG. 7, in the present exemplary embodiment only the first preceding vehicle 70 out of the surrounding objects around the host vehicle is displayed on the HUD 56, thereby enabling the display on the HUD 56 to be suppressed from appearing annoyingly cluttered to the occupant.

At step 112, as illustrated in the examples of FIG. 6 and FIG. 7, the control section 55 superimposes display of the first preceding vehicle 70 and also superimposes display of other surrounding objects 72 on the third person perspective multi-lane image displayed on the MET 58, with display of the other surrounding objects 72 being incrementally toned-down according to their importance level. Examples of toning down include using fainter display colors, using duller display colors (such as grays), and lowering definition so as to blur the display. After step 112, processing returns to step 104.

In situations in which surrounding objects other than the first preceding vehicle are around the host vehicle, were all the surrounding objects to be displayed on the MET 58 using a standard display as illustrated in the examples of FIG. 10 and FIG. 11, then the display on the MET 58 would appear annoyingly cluttered to the occupant. In contrast thereto, as illustrated in FIG. 6 and FIG. 7, in the present exemplary embodiment surrounding objects 72 other than the first preceding vehicle 70 around the host vehicle are displayed toned-down according to their importance level, thereby enabling the display on the MET 58 to be suppressed from appearing annoyingly cluttered to the occupant. This also enables the occupant to be made aware of the importance level of each of the surrounding objects other than the first preceding vehicle around the host vehicle.

On the other hand, in cases in which an event is underway during driving of the host vehicle, affirmative determination is made at step 108 and processing transitions to step 114. At step 114, the control section 55 determines whether or not the event that is underway during driving of the host vehicle is an event in which a second preceding vehicle driving ahead in a lane other than the current traveling lane of the host vehicle is changing lanes into the current traveling lane of the host vehicle (cutting in).

Figure 8:
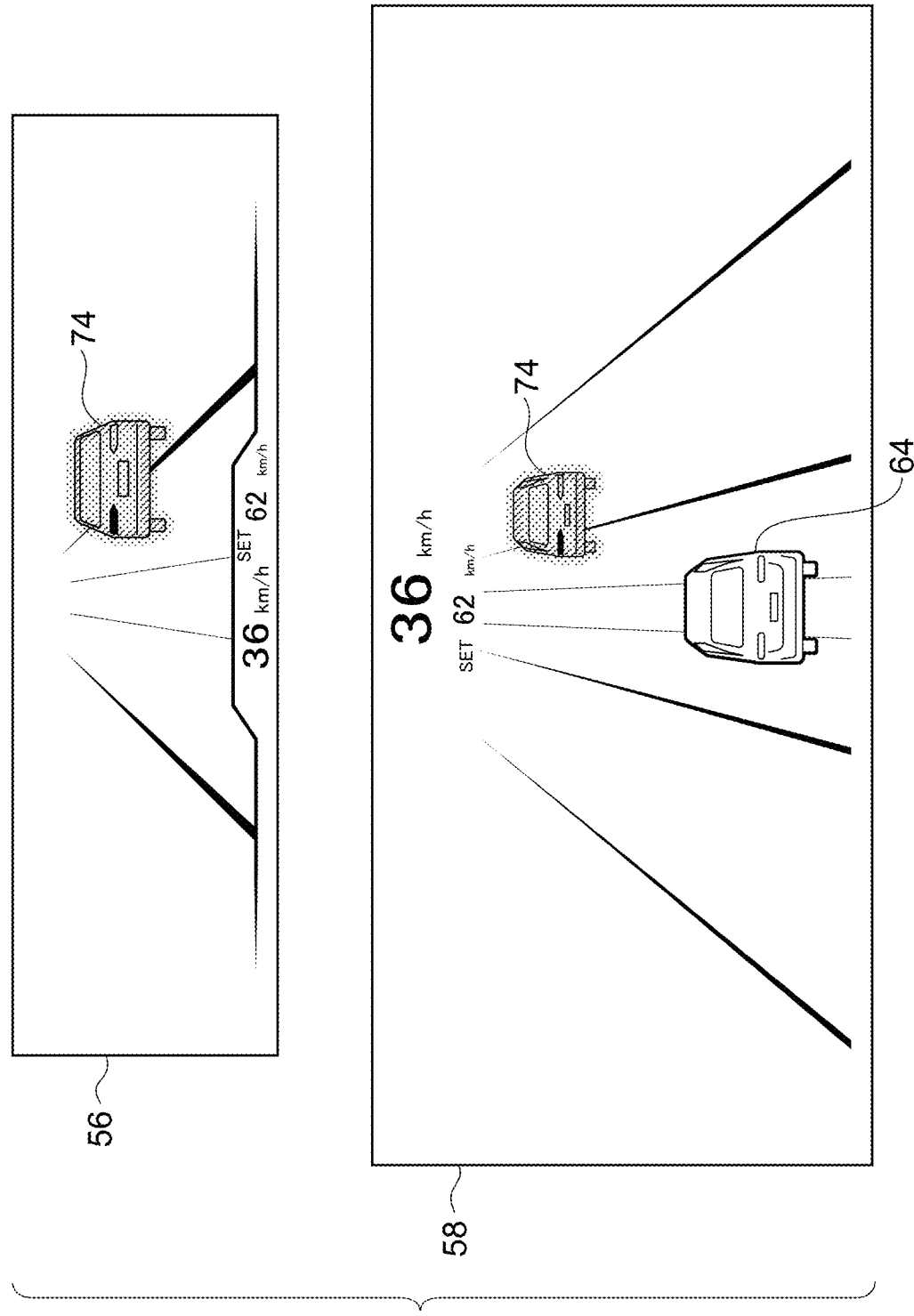
FIG. 8 is an image illustrating an example of display on a HUD and a MET according to an exemplary embodiment.

In cases in which an affirmative determination is made at step 114, processing transitions to step 116. At step 116, as illustrated in the example of FIG. 8, the control section 55 emphatically displays a second preceding vehicle 74 on the HUD 56 according to the importance level set for the second preceding vehicle. Note that examples of emphatic display include display in a particular display color (such as amber), display surrounded by a frame, and flashing display. Thus, in cases in which the second preceding vehicle 74 is changing lanes into the current traveling lane of the host vehicle, i.e. cutting in, the attention of the occupant can be drawn to this display such that the occupant can easily be made aware of this cutting in. Moreover, since surrounding objects other than the second preceding vehicle 74 are not displayed on the HUD 56, the display on the HUD 56 can be suppressed from appearing annoyingly cluttered to the occupant.

At step 118, as illustrated in the example of FIG. 8, the control section 55 emphatically displays the second preceding vehicle 74, and tones down display of any other surrounding objects according to their importance level in the third person perspective multi-lane image being displayed on the MET 58. Note that the example in FIG. 8 illustrates a situation in which no surrounding objects other than the second preceding vehicle 74 are around the host vehicle. This enables the attention of the occupant to be drawn to this display, such that the occupant is easily made aware of this cutting in, and enables the display on the MET 58 to be suppressed from appearing annoyingly cluttered to the occupant. After step 118, processing returns to step 104.

In cases in which a negative determination is made at step 114, processing transitions to step 120. At step 120, the control section 55 determines whether or not the event that is underway during driving of the host vehicle is an event in which the host vehicle is changing lanes from the current traveling lane of the host vehicle to a lane other than the current traveling lane.

Figure 9:
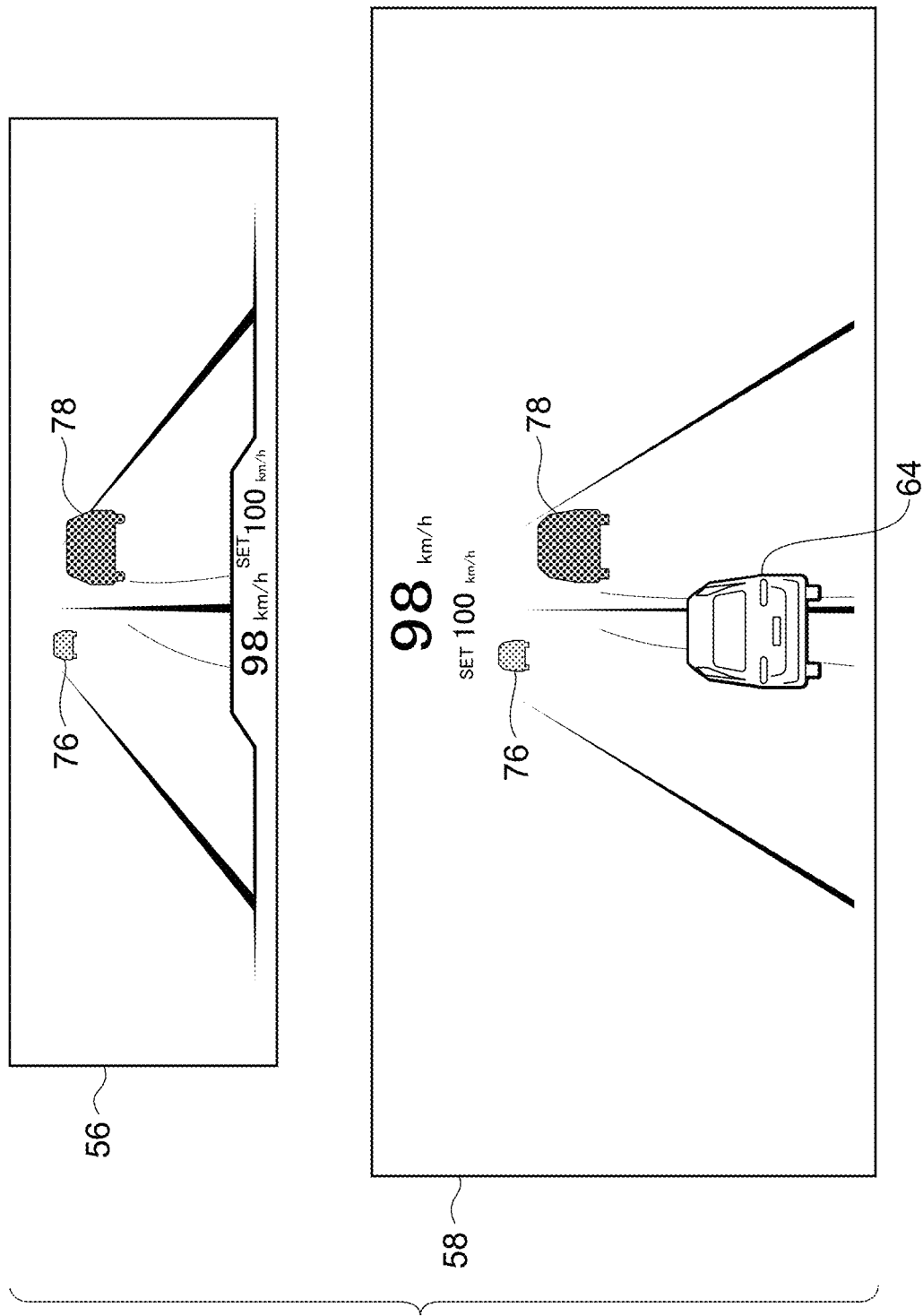
FIG. 9 is an image illustrating an example of display on a HUD and a MET according to an exemplary embodiment.

In cases in which affirmative determination is made at step 120, processing transitions to step 122. At step 122, as illustrated in the example of FIG. 9, the control section 55 superimposes display of a first preceding vehicle 76 traveling ahead in the current traveling lane of host vehicle, and of a second preceding vehicle 78 traveling ahead in a lane other than the current traveling lane of the host vehicle, on the HUD 56. Thus, in cases in which the host vehicle is changing lanes from the current traveling lane of the host vehicle to a lane other than the current traveling lane, the occupant viewing the HUD 56 can easily be made aware of the presence of the first preceding vehicle 76 and the second preceding vehicle 78 that are relevant to the lane change. Since surrounding objects other than the first preceding vehicle 76 and the second preceding vehicle 78 are not displayed on the HUD 56, the display on the HUD 56 can be suppressed from appearing annoyingly cluttered to the occupant.

At step 124, as illustrated in the example of FIG. 9, the control section 55 superimposes display of the first preceding vehicle 76 and the second preceding vehicle 78 on the MET 58, and tones down the superimposed display of any other surrounding objects according to their importance level. Note that the example in FIG. 9 illustrates a situation in which no surrounding objects other than the first preceding vehicle 76 and the second preceding vehicle 78 are around the host vehicle. After step 124, processing returns to step 104.

Thus, in cases in which the host vehicle is changing lanes from the current traveling lane of the host vehicle to a lane other than the current traveling lane, the occupant viewing the MET 58 can easily be made aware of the presence of the first preceding vehicle 76 and the second preceding vehicle 78 that are relevant to the lane change. Moreover, the display on the MET 58 can be suppressed from appearing annoyingly cluttered to the occupant.

In cases in which a negative determination is made at step 120, processing transitions to step 126. At step 126, the control section 55 performs display control processing in response to the event underway during driving of the host vehicle (such as lanes merging, or passing through an intersection), and then processing returns to step 104. In such cases also, since as few surrounding objects as possible are displayed on the HUD 56 according to their importance level, the display on the HUD 56 can be suppressed from appearing annoyingly cluttered to the occupant.

As described above, in the present exemplary embodiment, the first display (MET 58) is provided inside the cabin of the host vehicle so as to be capable of being viewed by the occupant, and the second display (HUD 56) is also provided inside the cabin of the host vehicle so as to be capable of being viewed by the occupant. The acquisition section 53 acquires information regarding surrounding objects around the host vehicle. The control section 55 suppresses display on the second display of images of surrounding objects other than a first preceding vehicle traveling ahead in the current traveling lane of the host vehicle from out of surrounding object images for which information has been acquired by the acquisition section 53. Thus, even in cases in which the display region of the second display has a limited surface area, as in the case of the HUD 56, and there are multiple surrounding objects around the host vehicle, the display on the second display can be suppressed from appearing annoyingly cluttered to the occupant.

Moreover, in the present exemplary embodiment, in cases in which an event is underway during driving of the host vehicle, the control section 55 displays on the second display an image of a surrounding object other than the first preceding vehicle, as set in response to the event. Displaying images of surrounding objects other than the first preceding vehicle in response to the event underway during driving of the host vehicle in this manner enables the occupant viewing the display on the second display to be prompted to pay attention.

Moreover, in the present exemplary embodiment, in cases in which the event that is underway during driving of the host vehicle is an event in which a second preceding vehicle traveling ahead in a lane other than the current traveling lane of the host vehicle is changing lanes into the current traveling lane of the host vehicle, the control section 55 emphatically displays the second preceding vehicle on the second display. Thus, in cases in which the second preceding vehicle is changing lanes into the current traveling lane of the host vehicle, i.e. cutting in, the occupant can easily be made aware that the second preceding vehicle is cutting in.

Moreover, in the present exemplary embodiment, in cases in which the event that is underway during driving of the host vehicle is an event in which the host vehicle is changing lanes from the current traveling lane of the host vehicle to a lane other than the current traveling lane, the control section 55 displays on the second display both a first preceding vehicle traveling ahead in the current traveling lane, and a second preceding vehicle traveling ahead in a lane other than the current traveling lane. Thus, in cases in which the host vehicle is changing lanes from the current traveling lane of the host vehicle to a lane other than the current traveling lane, the occupant can easily be made aware of the presence of the first preceding vehicle and the second preceding vehicle that are relevant to the lane change.

Moreover, in the present exemplary embodiment, the control section 55 also displays on the first display images surrounding objects for which information has been acquired by the acquisition section 53. Using different display formats for the first display and the second display enables the display region of the first display to be effectively utilized in cases in which the display region of the first display has a comparatively large surface area, as in the case of the MET 58.

Moreover, in the present exemplary embodiment, the control section 55 displays on the first display images of surrounding objects other than the first preceding vehicle traveling ahead in the current traveling lane of the host vehicle such that these surrounding objects images are displayed less prominently than the image of the first preceding vehicle. This enables the display on the first display to be suppressed from appearing annoyingly cluttered to the occupant, even in cases in which multiple surrounding objects are around the host vehicle.

Moreover, in the present exemplary embodiment, the control section 55 displays the images of surrounding objects other than the first preceding vehicle less prominently than the first preceding vehicle image by toning down display of the surrounding object images. Creating a distinction between display of the first preceding vehicle image and other surrounding object images in this manner enables the occupant to be made aware of the respective degrees of influence on the host vehicle during driving of the host vehicle.

Moreover, in the present exemplary embodiment, the first display is a display (MET 58) provided to the instrument panel of the host vehicle, and the second display is the HUD 56 reflected on the windshield or the like that has a display range covering part of a forward field of view of the occupant of the host vehicle. The occupant of the host vehicle is thereby able to quickly perceive the content displayed on the HUD 56 without deliberately changing their focal point when looking out toward the front of the host vehicle. Display of images of surrounding objects other than the first preceding vehicle in the display region of the HUD 56 is suppressed, thereby enabling any annoyance felt by the occupant attempting to look out toward the front to be suppressed. Moreover, display of surrounding objects other than the first preceding vehicle that have been suppressed from display on the HUD 56 can be performed on the MET 58.

Moreover, in the present exemplary embodiment, the first display and the second display have differently sized display regions. Suppressing the amount of information displayed on the second display (HUD 56) relative to the amount of information displayed on the first display (MET 58) is capable of alleviating a sense of annoying clutter to the occupant, and also enables amounts of information that are suited to the respective display regions to be provided to the occupant.

Although examples have been given in FIG. 6 to FIG. 9 in which the surrounding objects are vehicles (four-wheel vehicles), there is no limitation thereto. The surrounding objects may be two-wheel vehicles (such as bicycles) or pedestrians.

Although a format has been described in which the MET 58 is employed as the first display and the HUD 56 is employed as the second display, there is no limitation thereto. For example, a central monitor provided to a central portion of the instrument panel of the vehicle may be employed as either the first display or the second display.

Although a format has been described in which the autonomous driving ECU 34 performs level 2 or level 3 autonomous driving, there is no limitation thereto. A format may be applied in which the autonomous driving ECU 34 performs level 4 or level 5 autonomous driving.

A format has been described in which the display control program 54, serving as an example of an onboard display program according to the present disclosure, is pre-stored (installed) in the storage section 48 of the display control ECU 42. However, the onboard display program according to the present disclosure may be provided in a format recorded onto a non-transitory recording medium such as a CD-ROM, a DVD-ROM, or a memory card.

What is claimed is:

1. An onboard display device comprising:
   a first display provided inside a cabin of an host vehicle;
   a second display provided inside the cabin of the host vehicle; and
   a processor configured to acquire information regarding surrounding objects around the host vehicle, and suppress to display on the second display an image of a surrounding object other than a first preceding vehicle traveling ahead in a current traveling lane of the host vehicle from out of the surrounding objects.

2. The onboard display device of claim 1, wherein:
   in cases in which an event is underway during driving of the host vehicle, the processor is configured to display on the second display an image of a surrounding object other than the first preceding vehicle, as set in response to the event.

3. The onboard display device of claim 2, wherein:
   in cases in which the event underway during driving of the host vehicle is an event in which a second preceding vehicle traveling ahead in a lane other than the current traveling lane of the host vehicle is changing lanes into the current traveling lane of the host vehicle, the processor is configured to emphatically display the second preceding vehicle on the second display.

4. The onboard display device of claim 2, wherein:
   in cases in which the event underway during driving of the host vehicle is an event in which the host vehicle is changing lanes from the current traveling lane of the host vehicle to a lane other than the current traveling lane, the processor is configured to display on the second display both the first preceding vehicle traveling ahead in the current traveling lane and a second preceding vehicle traveling ahead in the lane other than the current traveling lane.

5. The onboard display device of claim 3, wherein:
in cases in which the event underway during driving of the host vehicle is an event in which the host vehicle is changing lanes from the current traveling lane of the host vehicle to a lane other than the current traveling lane, the processor is configured to display on the second display both the first preceding vehicle traveling ahead in the current traveling lane and the second preceding vehicle traveling ahead in the lane other than the current traveling lane.

6. The onboard display device of claim 1, wherein the processor is configured to display on the first display an image of a surrounding object for which the information has been acquired.

7. The onboard display device of claim 2, wherein the processor is configured to display on the first display an image of a surrounding object for which the information has been acquired.

8. The onboard display device of claim 3, wherein the processor is configured to display on the first display an image of a surrounding object for which the information has been acquired.

9. The onboard display device of claim 6, wherein:
the processor is configured to display on the first display an image of a surrounding object other than the first preceding vehicle traveling ahead in the current traveling lane of the host vehicle such that the surrounding object image is displayed less prominently than an image of the first preceding vehicle.

10. The onboard display device of claim 9, wherein:
the processor is configured to display the image of the surrounding object other than the first preceding vehicle less prominently than the image of the first preceding vehicle by toning down display of the image of the surrounding object other than the first preceding vehicle.

11. The onboard display device of claim 1, wherein:
the first display is a meter display of the host vehicle; and
the second display is a head-up display of the host vehicle.

12. The onboard display device of claim 2, wherein:
the first display is a meter display of the host vehicle; and
the second display is a head-up display of the host vehicle.

13. The onboard display device of claim 3, wherein:
the first display is a meter display of the host vehicle; and
the second display is a head-up display of the host vehicle.

14. The onboard display device of claim 1, wherein:
the first display is configured with a larger display region than the second display; and
the second display is configured as a display region below an exterior scene ahead as viewed from the perspective of an occupant of the host vehicle looking ahead from the host vehicle.

15. The onboard display device of claim 2, wherein:
the first display is configured with a larger display region than the second display; and
the second display is configured as a display region below an exterior scene ahead as viewed from the perspective of an occupant of the host vehicle looking ahead from the host vehicle.

16. The onboard display device of claim 3, wherein:
the first display is configured with a larger display region than the second display; and
the second display is configured as a display region below an exterior scene ahead as viewed from the perspective of an occupant of the host vehicle looking ahead from the host vehicle.

17. An onboard display method in which a computer executes processing, the processing comprising:
acquiring information regarding surrounding objects around an host vehicle; and
out of a first display provided inside a cabin of the host vehicle and a second display provided inside the cabin of the host vehicle, suppressing to display on the second display an image of a surrounding object other than a first preceding vehicle traveling ahead in a current traveling lane of the host vehicle from out of the surrounding objects.

18. A non-transitory computer readable storage medium holding an onboard display program that causes a computer to execute processing, the processing comprising:
acquiring information regarding surrounding objects around an host vehicle; and
out of a first display provided inside a cabin of the host vehicle and a second display provided inside the cabin of the host vehicle, suppressing to display on the second display an image of a surrounding object other than a first preceding vehicle traveling ahead in a current traveling lane of the host vehicle from out of the surrounding objects.

* * * * *